United States Patent [19]

Norton et al.

[11] 3,857,608

[45] Dec. 31, 1974

[54] ANCHOR FOR TRAILER SUPPORTED HOPPER

[75] Inventors: Morrison Kai Norton; Lawrence Raymond Timko, both of Woodland, Calif.

[73] Assignee: Titan Trailer Corporation, Woodland, Calif.

[22] Filed: Mar. 23, 1973

[21] Appl. No.: 344,427

[52] U.S. Cl............................ 298/35 M, 296/35 R
[51] Int. Cl............................................. B60p 1/56
[58] Field of Search...................... 298/24; 296/35 R

[56] References Cited
UNITED STATES PATENTS
2,102,402  12/1937  Zeder...................... 296/35 R
2,962,295  11/1960  Tenenbaum.............. 296/35 R X
3,310,345   3/1967  Rowden.................... 298/35 M Primary Examiner—Philip Goodman
Attorney, Agent, or Firm—Lothrup & West

[57] ABSTRACT

A pair of elongated, horizontal fore and aft saddles mounted on the opposite sides of a hopper is supported on the respective underlying longitudinal side rails of a trailer having a central well to receive the hopper. Fore and aft as well as transverse and vertical force components are transferred between the hopper and the trailer side rails by an adapter frame and a rail frame, with a buffering or cushioning effect provided by an interposed resilient bushing, the bushing also allowing limited but adequate relative movement between the rails and the respective hopper saddles as the rails successsively bow and straighten in dependence upon load conditions. A zone of weakness to excessive vertical shear forces is intentionally built in to the frame connections to afford relatively non-destructive separation between the trailer and the hopper in the event of collision or other accident.

8 Claims, 4 Drawing Figures

ANCHOR FOR TRAILER SUPPORTED HOPPER

BACKGROUND OF THE INVENTION

Drop-in hoppers, i.e., hoppers lowered into a trailer well and anchored, have heretofore customarily been attached to the longitudinal side rails of a hopper-receiving trailer by several bolts located at intervals along the length of the horizontal, linear hopper side saddles supported on the underlying trailer rails.

Since trailers of this type are constructed with a built-in upward central bow in the side rails which straighten out to linear horizontal alignment as the cargo weight approaches the load unit, there is relative vertical movement between the side saddles and the underlying rails, as loading and unloading occurs, the extent of relative movement being especially pronounced at locations removed in both fore and aft directions from the transverse center line of the trailer where the top of the bow is located. There is also a slight, although noticeable relative longitudinal movement between the hopper side saddles and the subjacent rails, particularly, as before, near the reaches more distant from the transverse center line. Horizontal displacement takes place, of course, since the horizontal length of the rail is greater when the rail is flatted to linear alignment, under load, than when the rail is upwardly bowed, under no-load conditions.

In either case, i.e., vertical displacement or horizontal misalignment, the mounting bolt arrangement heretofore utilized has led to shearing of the bolts or rupturing of the metal encompassing the bolts.

In addition, the rigidity inherent in the conventional bolt-anchored structure transfers all of the impact force imparted to one of the units, in a wreck or accident, to the other unit, thereby causing excessive damage to both units.

Furthermore, the use of a bolt hole in any structural member, such as in the hopper side saddles or the trailer rails, weakens the member, places the member in shear when bolted and provides a place for fractures to begin.

SUMMARY OF THE INVENTION

The invention relates to improvements in anchoring, or mounting, a drop-in hopper in the well of a flat bed trailer.

It is an object of the invention to provide an anchor for a trailer-supported hopper which eliminates the use of bolt holes and bolts in the longitudinal side rails of the trailer and in the elongated side saddles of the hopper supported on the rails.

It is another object of the invention to provide an anchor of the above nature which reduces to a minimal amount the extent of vertical displacement and horizontal misalignment between the attaching means of the hopper and the trailer at the precise junction points of the two units.

It is still another object of the invention to provide an anchor of the foregoing type which effectively buffers and resiliently absorbs such small displacements and vibrations as may occur at the junctions of the hopper and the trailer.

It is a further object of the invention to build in to the structure, at predetermined locations, one or more planes of weakness, or planes of abscission, allowing separation of the two units in the event of wreck or accident, thereby largely obviating damage to both the hopper and the trailer when only the trailer, for example, is involved in a collision.

It is yet a further object of the invention to provide a drop-in hopper anchor which is economical and compact in size, yet is rugged, durable and long-lived.

It is still a further object of the invention to provide a drop-in hopper anchor which not only enables a hopper to be readily installed in a trailer unit, but which can also be easaily removed therefrom, as the need arises.

It is an additional object of the invention to provide a generally improved anchor for a trailer-supported hopper.

Other objects, together with the foregoing, are attained in the embodiment described in the following description and illustrated in the accompanying drawings, in which.

DESCRIPTION OF A PREFERRED EMBODIMENT OF THE INVENTION

Figure 1:
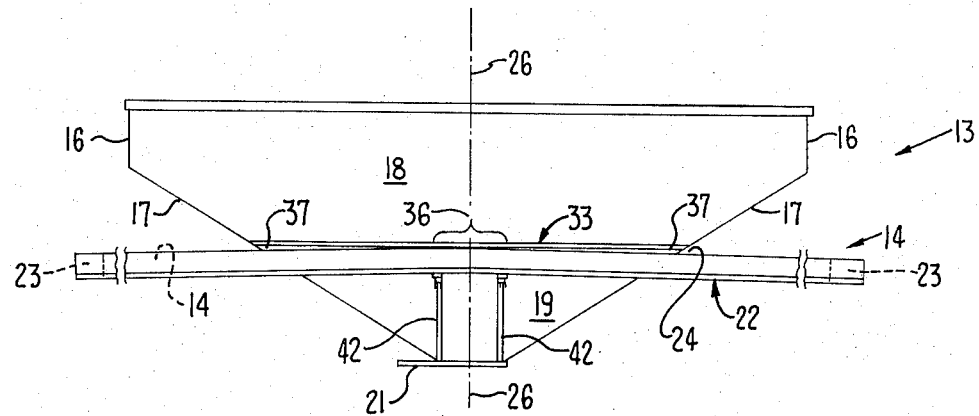
FIG. 1 is a fragmentary, side elevational view to a reduced scale, showing a drop-in hopper with horizontal side saddles supported on the longitudinal side-rails of a trailer in unloaded condition, with a central upward bow built into the rails a portion of the rails being broken away to reduce the extent of the figure.

While the anchor of the invention is susceptible of numerous physical embodiments, depending upon the environment and requirements of use, substantial numbers of the herein shown and described embodiment have been made, tested and used, and have performed very satisfactorily.

The anchor of the invention, generally designated by the reference numeral 12, detachably secures a hopper 13 to a trailer 14.

The hopper 13 can include pairs of vertical end walls 16 and inwardly and downwardly converging end floor walls 17, as well as pairs of opposite vertical side walls 18 and inwardly and downwardly side floor walls 19, the inclined floor walls 17 and 19 defining a central opening covered by a suitably controlled closure, such as a slide gate 21. The side floor wall 19 and the side wall 18 meet at an obtusely angled joint 20.

In customary manner, the trailer 14 includes a pair of longitudinal side rails 22 and transverse end rails 23 defining a central well 24 into which the hopper 13 is lowered at the time of installation.

As appears most clearly in FIG. 1, in somewhat exaggerated manner, the side rails 22 are bowed upwardly, the maximum amount of vertical displacement above a linear, fore and aft, horizontal line occurring at approximately on the central vertical transverse plane 26. The slight bow, or arch, is built into the side rails 22 so that as the cargo weight approaches the rated load capacity, the rails will have straightened out to approximately horizontal. A sway-back effect is thereby obviated. As the load is removed, the bow returns.

Figure 2:
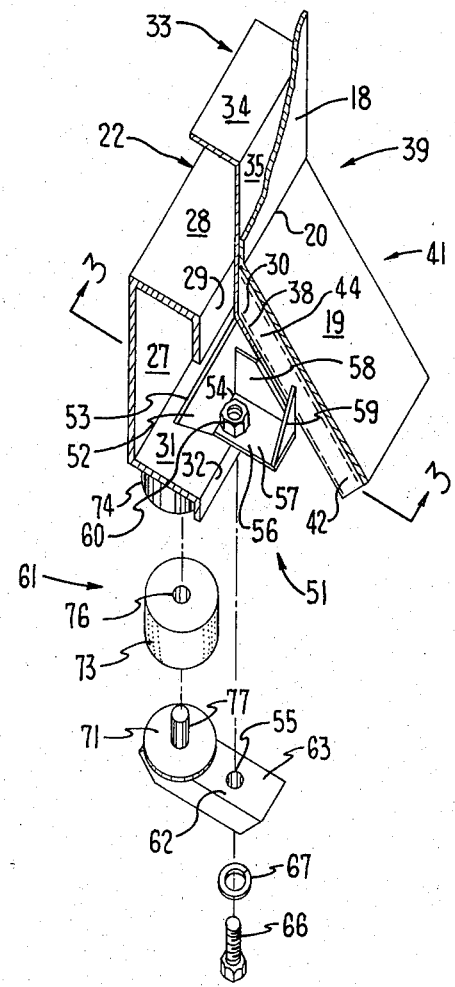
FIG. 2 is an exploded view of the anchor components.
Figure 3:
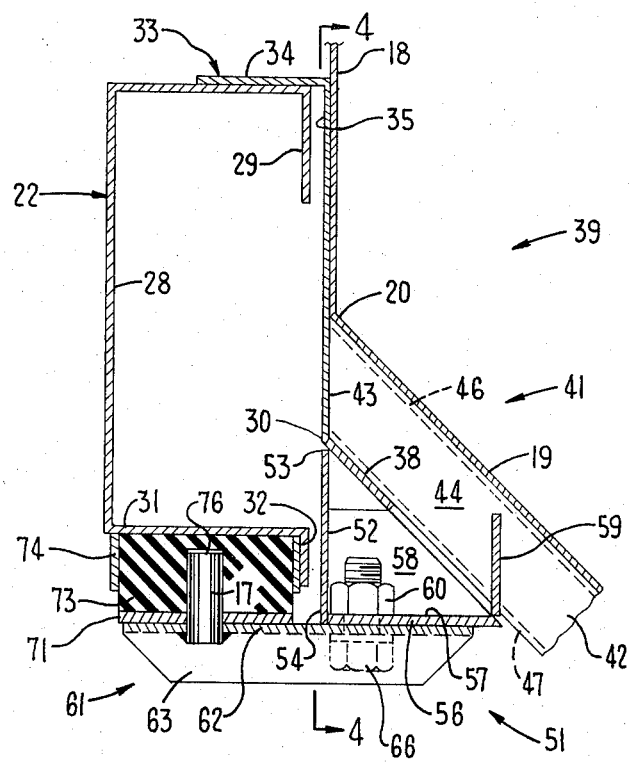
FIG. 3 is a transverse sectional view of the anchor, when installed, taken on the line 3—13 in FIG. 2; and, FIG. 4 is a fragmentary side elevational view taken on the line 4—4 in FIG. 3.
Figure 4:
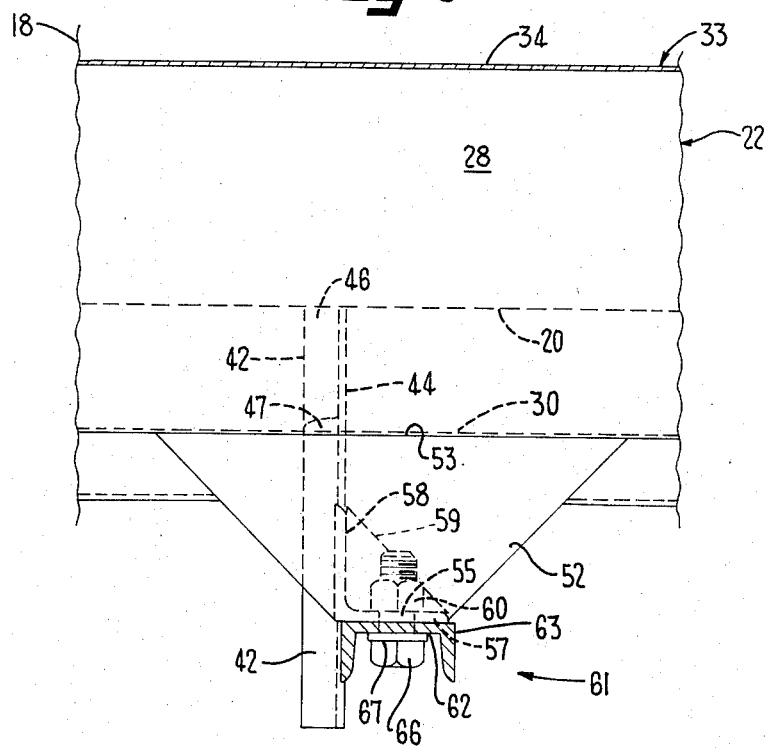

The rail 22 as constructed in FIGS. 2–4, for example, includes an outer vertical web 27, an inwardly projecting top flange 28 with a downturned lip 29, and an inwardly projecting bottom flange 31 with a depending apron 32.

Supported on the top flange 28 of the rail 22 is a saddle, generally designated by the reference numeral 33. There is one saddle 33 mounted on each of the opposite vertical sides 18 of the hopper 13, the saddles 33 being horizontally aligned in a fore and aft direction and overlying the respective subjacent side rails 22 for support thereby. Each saddle includes a horizontal flange portion 34, a depending vertical plate portion 35 bent along a lower margin 30 at an obtuse angle and an angled portion 38 parallel to the floor 19.

As is clearly indicated in FIG. 1, since the saddles 33 are horizontal for their entire length along the side walls 18 of the hopper 13, whereas the side rails 22 are bowed upwardly under light or no-load conditions, the central portion 36, or central zone, of the saddles 33, i.e., the portion of each saddle 33 extending for a short distance on each side of the central transverse plane 26, is substantially parallel to and the horizontal flange portion 34 of the saddle is in engagement with the subjacent horizontal portion 28 of the rail 22. However, as the distance, fore and aft, from the center plane 26 increases, the extent of the separation increases, approaching a noticeable gap 37 at the forward and after ends of the saddle 33. As the load increases, the gap will decrease, approaching zero at about full load. As unloading occurs, the gaps 37 re-occur.

In order to overcome the problems inherent in trying to bolt the saddles 33 to the support rails 22, we have mounted the hopper saddles 33 to the trailer side rails only in the central portion 36, or zone, of minimum relative movement between the saddles and the rails.

On each of the opposite sides of the hopper, in other words, we have installed a pair of substantially identical anchor units of the invention 12, the particular embodiments shown and described herein being designated by the reference numeral 39.

For convenience, the anchor is subdivided into three sub-assemblies, or frames, namely, the hopper frame 41, the adapter frame 51 and the rail frame 61.

The hopper frame 41 includes the elongated, linear, fore and aft horizontal top flange 34, vertical side plate 35 and angled portion 38 of the horizontal saddle 33. As previously indicated and as appears most clearly in FIG. 3, the top horizontal flange 34 of the saddle 33 overlies and is supported by the subjacent horizontal top flange 28 of the side rail 22, and the side plate 35 depends in spaced parallel relation with respect to the adjacent vertical lip 29 of the side rail 22.

Also forming a part of the hopper frame 41 is a C-shaped channel 42 beveled at its upper end 43 where it is attached, as by welding, to the adjacent lower end portion of the vertical saddle plate 35 and the subjacent angled portion 38 of the saddle. The sloping hopper floor 19 overlies and is supported by the channel 42. The channel 42 includes a web 44, an upper flange 46 and a lower flange 47.

As appears most clearly in FIG. 1, there are two such downwardly and inwardly inclined channels 42, extending to the discharge, or lower end, of the hopper. The upper ends of the channels 42 are located in the central zone 36 of minimal displacement, as previously indicated, and there are two channels 42 on each side of the hopper, each pair being arranged in substantial mirror symmetry.

The adapter frame 51 provides a transition between the hopper frame 41 and the rail frame 61 and also affords a built-in breakaway feature, as will subsequently be explained in more detail.

The adapter frame 51 includes a vertical metal plate 52 which is of inverted truncated triangular shape, as shown most clearly in FIG. 4, the upper edge 53 of which can be secured, as by welding, to the lower margin 30 of the saddle plate 35.

The lower edge 54 of the plate 52 is, in turn, secured to the outer end of an angle 56 extending transversely and including a horizontal flange 57 and a vertical flange 58. The inner end of the vertical flange 58 is beveled to parallelism with the adjacent sloping channel 42; and at the inner end of the horizontal flange 57 there is mounted a vertical triangular gusset 59 which, in turn, is welded to the adjacent vertical web 44 of the sloping channel 42.

Completing the adapter frame 51 is a nut 60 welded to the horizontal flange 57 of the angle 56, the central threaded opening in the nut being centered over a registering vertical opening 55 in the horizontal flange 57 of the angle 56.

The vertical opening 55 continues downwardly through the web 62 of a cross-channel 63 forming the bottom member of the rail frame 61, the opening 55 receiving a bolt 66 and lock washer 67. The upper threaded portion of the bolt 66 is inserted upwardly through the opening 55 and into threaded engagement with the nut 60 affixed to the horizontal flange 57 of the angle 56.

As the bolt 66 is tightened, the web 62 of the cross-channel 63 is urged upwardly into tight engagement with the bottom face of the transverse angle 56 of the adapter frame 51. Concurrently, an annular washer 71 supported on the top surface of the inner end portion of the channel web 62 is urged upwardly against the bottom of an annular bushing 73 of somewhat resilient elastomeric material, such as rubber, partially enclosed within a hollow, right circular cylindrical socket 74 mounted, as by welding, on the bottom surface of the horizontal bottom flange 31 of the rail 22. Upward tightening of the cross-channel 63 against the overlying angle flange 57 and the superposed washer 71 and bushing 73 also urges upwardly, through the annular washer and into an axial bore 76 in the bushing 73, a vertical pin 77 welded at its lower end to the cross-channel 63, as appears most clearly in FIG. 3.

In other words, the threaded connection between the bolt 66 and the nut 60 serves to connect and detachably secure the rail frame 61 to the adapter frame 51 and thus to the hopper frame 41, to which the adapter frame is secured by the welded triangular gusset 59 and the joint between the upper edge 53 of the adapter plate 52 and the lower margin 30 of the saddle plate 35.

The dimensions of the components are selected so that in fully secured and installed position, as shown in FIG. 3, the three frames are firmly but yieldingly tied together so that thrust forces either in a vertical direction, or in a fore or aft or a transverse direction, are transferred throughout. The rubber bushing 73, serves as an interior buffer, not only absorbing vibrations and cushioning against shocks but also resiliently yielding as relative displacement occurs as a result of bowing of the rails as successive loading and unloading occurs.

It is to be noted that while the structure herein eliminates bolts and bolt holes in the rails and in the saddles, for greater strength, a secure yet sufficiently yielding connection is afforded. At the same time, provision is made for separation of the hopper from the rails in the event of wreck or accident, such as a collision involving the trailer. A separation, or abcission, zone is afforded in each of the four anchors 39 securing the hopper to the rails. That is to say, the gusset 59 affords a relatively strong welded connection to the adjacent vertical face of the web 44 and, along with the connection between the adapter frame plate 52 and the saddle plate 35, serves securely to attach the hopper to the rails under ordinary operating conditions. In the event of extraordinary impact shock, however, the gusset connection will rupture in shear and the weld along the upper margin 53 of the adapter frame plate 52 will break away to allow the hopper to move away relative to the trailer.

It can therefore be seen that we have provided a hopper anchor which is rugged and durable, yet is capable of yielding, within limits, to stresses arising from displacements brought about by successive loading and unloading, and which also allows the hopper to separate from the trailer in the even of a wreck or collision. trailer in the event of a wreck or collision.

What is claimed is:

1. Anchor for trailer-supported hopper comprising:
   a. a hopper supporting frame including an elongated, fore and aft saddle mounted on each side of a hopper for supporting engagement with a respective one of a pair of underlying longitudinal side rails of a trailer, said fore and aft saddle including an inverted L-shape in section member having a horizontal portion supported on top of the respective subjacent side rail and a vertical portion depending from the inner edge of said horizontal portion and terminating in a lower fore and aft margin, said hopper supporting frame further including a hopper floor support channel secured at its upper end to said vertical portion of said saddle and extending transversely angularly downwardly and inwardly below the hopper floor in supporting relation thereto;
   b. an adapter frame mounted on each side of the hopper below and adjacent the transverse center line of each of said saddles;
   c. a rail frame mounted on the bottom of each of the rails in register with a respective one of said adapter frames; and,
   d. means for attaching said adapter frames to said rail frames, said attaching means being effective to transfer thrust forces between said rail frames, said adapter frames and said hopper supporting frames.

2. An anchor as in claim 1 in which the transverse center line of said saddles substantially coincides with the transverse center line of said longitudinal side rails of the trailer.

3. An anchor as in claim 1 in which said adapter frame includes a vertical fore and aft plate extending between an upper end and a lower end, a transverse angle mounted at one end on said vertical plate, the other end of said angle extending toward said hopper floor support channel, and a fore and aft gusset mounted at one end on said transverse angle, the other end of said gusset being in engagement with said hopper floor support channel for attachment thereto when said upper end of said vertical fore and aft plate is in engagement with said lower fore and aft margin of said saddle.

4. An anchor as in claim 3 in which said other end of said angle is beveled to parallelism with the adjacent one of said hopper floor support channels.

5. An anchor as in claim 4 wherein one of the flanges of said transverse angle is substantially horizontal and said adapter frame includes a nut mounted on top of the horizontal flange with the threaded opening in said nut in register with a vertical hole in the horizontal flange.

6. An anchor as in claim 5 in which said rail frame includes a socket with its axis in vertical attitude mounted on the bottom of the rail, a rubber bushing disposed within said socket with the bottom end of said bushing protruding downwardly below said socket, a washer supporting the bottom of said bushing, a transversely oriented horizontal cross channel mounted at its outer end on said washer, the inner end of said cross channel underlying the horizontal flange of said angle, and a vertical pin mounted at its lower end on said cross channel and extending upwardly through registering bores in said washer and said bushing into close proximity to the bottom of said rail, said bushing being sufficiently resilient to yield under the thrust forces transferred between said rail and said hopper.

7. An anchor as in claim 6 further including a bolt, and a lock washer, said bolt being insertable upwardly through an aperture in said cross channel and said hole in the horizontal flange into threaded engagement with said nut, said bolt being effective to clamp said adapter frame to said rail frame, the combined height of said vertical portion of said saddle and said vertical plate being such that as said bolt is tightened in said nut and said horizontal portion of said saddle is supported on said rail, said cross channel and said washer bear snugly upwardly against said rubber bushing.

8. An anchor as in claim 7 wherein the attachhments between said vertical portion of said saddle and said vertical plate and between said gusset and said hopper floor support channel are subject to being ruptured as vertical shear forces are imposed on the rails and the adajcent portion of a hopper, the combined strength of the attachments being substantially less than the rupture strength of either said cross channel, said angle or said bolt.

* * * * *